US008672555B2

(12) United States Patent
Gardelle et al.

(10) Patent No.: US 8,672,555 B2
(45) Date of Patent: Mar. 18, 2014

(54) ROLLING BEARING HAVING INTERNAL LUBRICATION

(75) Inventors: Jean-Luc Gardelle, Luynes (FR); Alexandre Manceau, Saint Cyr sur Loire (FR); Yves-Andrè Liverato, St. Paterne Racan (FR)

(73) Assignee: Aktiebolaget SKF, Gothenburg (SE)

( * ) Notice: Subject to any disclaimer, the term of this patent is extended or adjusted under 35 U.S.C. 154(b) by 845 days.

(21) Appl. No.: 12/741,454

(22) PCT Filed: Nov. 4, 2008

(86) PCT No.: PCT/EP2008/064957
§ 371 (c)(1),
(2), (4) Date: Sep. 13, 2010

(87) PCT Pub. No.: WO2009/059979
PCT Pub. Date: May 14, 2009

(65) Prior Publication Data
US 2010/0327686 A1  Dec. 30, 2010

(30) Foreign Application Priority Data
Nov. 5, 2007  (FR) ...................... 07 58788

(51) Int. Cl.
*F16C 19/00* (2006.01)
*F16C 33/66* (2006.01)
(52) U.S. Cl.
USPC ............................ 384/475; 384/469; 384/473
(58) Field of Classification Search
USPC ......... 384/462, 463, 467, 469, 470, 473, 474, 384/513, 480, 488, 517, 537
See application file for complete search history.

(56) References Cited

U.S. PATENT DOCUMENTS

| 2,217,801 | A | * | 10/1940 | Katcher | 384/475 |
| 2,926,052 | A | * | 2/1960 | Cain, Jr. | 384/473 |
| 3,876,266 | A | * | 4/1975 | Rozentals | 384/536 |
| 4,286,829 | A | * | 9/1981 | Heemskerk | 384/469 |
| 4,334,720 | A | | 6/1982 | Signer | |
| 4,763,905 | A | * | 8/1988 | Zvonar | 277/372 |
| 5,320,433 | A | * | 6/1994 | Kimata et al. | 384/473 |
| 5,458,422 | A | * | 10/1995 | Zernickel et al. | 384/505 |
| 5,749,660 | A | * | 5/1998 | Dusserre-Telmon et al. | 384/475 |
| 6,172,436 | B1 | * | 1/2001 | Subler et al. | 310/90 |
| 2005/0281500 | A1 | | 12/2005 | Lin | |
| 2007/0292064 | A1 | * | 12/2007 | Fukuda | 384/470 |
| 2009/0034892 | A1 | * | 2/2009 | Akamatsu et al. | 384/473 |
| 2010/0195946 | A1 | * | 8/2010 | Zhou et al. | 384/462 |
| 2010/0316317 | A1 | * | 12/2010 | Feldmeier | 384/469 |

FOREIGN PATENT DOCUMENTS

| DE | 6912859 U | 8/1969 |
| DE | 102005016404 A1 | 10/2005 |
| DE | 102005033566 A1 | 1/2007 |
| EP | 0769631 A1 | 4/1997 |
| GB | 1245451 A | 9/1971 |
| WO | WO2006041040 A1 | 4/2006 |

* cited by examiner

*Primary Examiner* — Thomas R Hannon
*Assistant Examiner* — Yamilka Pinero Medina
(74) *Attorney, Agent, or Firm* — Bryan Peckjian; SKF USA Inc. Patent Department

(57) ABSTRACT

Rolling bearing having an inner ring (1) and an outer ring (2) with a row of rolling elements (3) held by a cage (4) between bearing races provided on the two rings, and an annular housing (5) surrounding one of said rings. Said ring forms with the housing at least one closed space (21a), (21b), inside which a lubricant is located.

20 Claims, 7 Drawing Sheets

ROLLING BEARING HAVING INTERNAL LUBRICATION

BACKGROUND OF THE INVENTION

The present invention relates to rolling bearings, in particular rolling bearings having an inner ring and an outer ring with one or more rows of rolling elements held by a cage between bearing races provided on the two rings. The rolling elements can, for example, be balls. The rolling bearings may be, for example, those used in industrial electric motors or in motor vehicle gearboxes. In such applications, the bearings are mainly loaded radially, often with a relatively weak load compared to the capacity of the bearings used. The rotational speeds in such applications are of the order of 3000 rpm. In such applications, the service life of the rolling bearing is essentially related to the lubrication of the bearing. Any defect in lubricating the bearing generally leads to rapid degradation and to failure of the bearing.

Deep-groove rolling bearings with a single row balls conventionally have seals or sealing flanges which can be lubricated "for life" by the grease initially located inside the bearing, circumferentially between the balls and radially between the bearing races. However, in the long term, the mixing of the grease, combined with its ageing and with the heating cycles that the bearing undergoes, cause the grease to degrade. It is possible to envisage periodic regreasing operations for this type of rolling bearings. However, these operations are expensive.

Patent application WO 2006/041040 (NTN) and German patent application DE 1 016 404 disclose a rolling bearing which has an independent lubricant reservoir that can be housed between the two rings of the bearing. The lubricant can be supplied onto the balls of the bearing by a radial duct delimited partly by a face of one of the rings of the rolling bearing and by a wall of the lubricant reservoir. Such a construction is complicated and expensive.

German patent application DE 10 2005 033 566 (Schaeffler), moreover, discloses a rolling bearing without clearance, in which the outer ring is in two parts. One of the parts of this ring is obtained by stamping sheet metal and delimits, together with a housing holding the two parts of the ring, a space, inside which an axially preloaded resilient element is housed. However, this document provides no particular means of lubricating the rolling bearing.

British patent application GB 1 245 451 (SKF) also discloses a rolling bearing with two rings and an annular housing surrounding one of the rings, and also a closed space filled with lubricant. European patent application EP 0 769 631 (Snecma) for its part shows a ball bearing having lubricant passages made in one of the rings. None of these known constructions allows satisfactory lubrication of the rolling elements in a genuinely effective and economic manner.

SUMMARY OF THE INVENTION

The present invention aims to solve the lubrication problems in this type of rolling bearing in both an effective and economic manner.

In one embodiment, a rolling bearing has an inner ring and an outer ring with at least one row of rolling elements held by a cage between bearing races provided on the two rings, an annular housing surrounding at least one of said rings. Said ring forms with the housing at least one closed space, inside which a lubricant is located. The closed space functions as a lubricant reservoir. Said ring is in two parts. Each of the two parts of said ring delimits a closed space with the housing. Passage means for the lubricant, comprising axial holes at least partly facing one another, are made in the thickness of a radial portion of each of the two parts of said ring in order to put the two closed spaces into communication.

This thus provides a rolling bearing which is able to operate for a long time by virtue of effective internal lubrication.

The lubricant may be grease or oil.

When the lubricant is oil, the latter may advantageously be contained in a porous element fitted inside the closed space.

Specific passage means are preferably provided for the lubricant to pass between the closed space and the bearing races.

In one embodiment, the passage means comprise radial surface portions of said ring, spaced apart from a radial shield adjacent to the housing, so as to leave an axial clearance.

The passage means may also comprise, instead of or in addition to the abovementioned axial clearance, radial holes made in the thickness of said ring.

The passage means may also comprise, instead of or in addition to the abovementioned axial clearance and the abovementioned radial holes, axial holes made in the thickness of said ring and communicating with radial passages.

These radial passages preferably open onto the bearing race of said ring.

The periphery of the ring of the rolling bearing surrounded by the housing may be in contact with an axial portion of the housing, and this enables said ring to be centred.

A radial portion of said ring may also be in contact with a radial shield of the housing.

In one embodiment, said ring is in two parts surrounded by the housing, the abovementioned closed space being formed by one of said parts and the housing.

Advantageously, each of the two parts may delimit a closed space with the housing such that the bearing has two lubricant reservoirs.

In a preferred embodiment, the two ring parts are identical, manufacture thereby being simplified and thus the costs reduced.

Each of the ring parts may thus comprise axial holes made in the thickness of a radial portion and communicating with radial grooves made on the inner face of said radial portion.

Therefore, the lubricant may be supplied to the bearing races throughout the operating lifetime of the bearing.

In a variant, the axial holes and the radial grooves of the two parts of said ring are facing one another, it being possible to provide angular indexing means to maintain the relative angular position of the two ring parts.

In one embodiment, resilient elements are fitted between each of the ring parts and the radial shields of the housing so as to preload the two ring parts on the rolling elements. The rolling bearing can therefore operate with no clearance.

In an advantageous embodiment, at least a part of said ring surrounded by the housing has been produced by cutting and stamping a metal sheet, said part having an outer axial portion in contact with an axial portion and a radial shield of the housing, a radial portion, a toroidal portion delimiting a part of a bearing race and an inner axial portion. The abovementioned closed space is delimited by said portions of the ring part and by the radial shield of the housing.

In any case, it may be advantageous to provide for the inner walls of the abovementioned closed space to have an oleophobic lining, in order to promote the emergence of the lubricant.

The ring of the bearing delimiting the closed space containing the lubricant may be the outer ring or the inner ring of the bearing.

When said ring is the inner ring of the bearing, it is advantageous for it also to be the rotating ring such that the centrifugal force exerted on the lubricant during operation of the bearing promotes the extraction of the lubricant and therefore the lubrication of the bearing races.

In another embodiment, the two rings of the bearing have the same structure. An annular housing surrounds each of the rings. Each of the two rings forms with each of the two housings at least one closed space, inside which a lubricant is located. Each of the two rings may have two closed spaces acting as lubricant reservoir. Radial and axial passages may be provided for the lubricant in the same manner as in the embodiments described hereinabove.

BRIEF DESCRIPTION OF THE SEVERAL VIEWS OF THE DRAWINGS

The present invention will be better understood with the aid of the detailed description of a number of embodiments given by way of non-limiting example and illustrated by the attached drawings, in which.

DETAILED DESCRIPTION OF THE INVENTION

Figure 1:
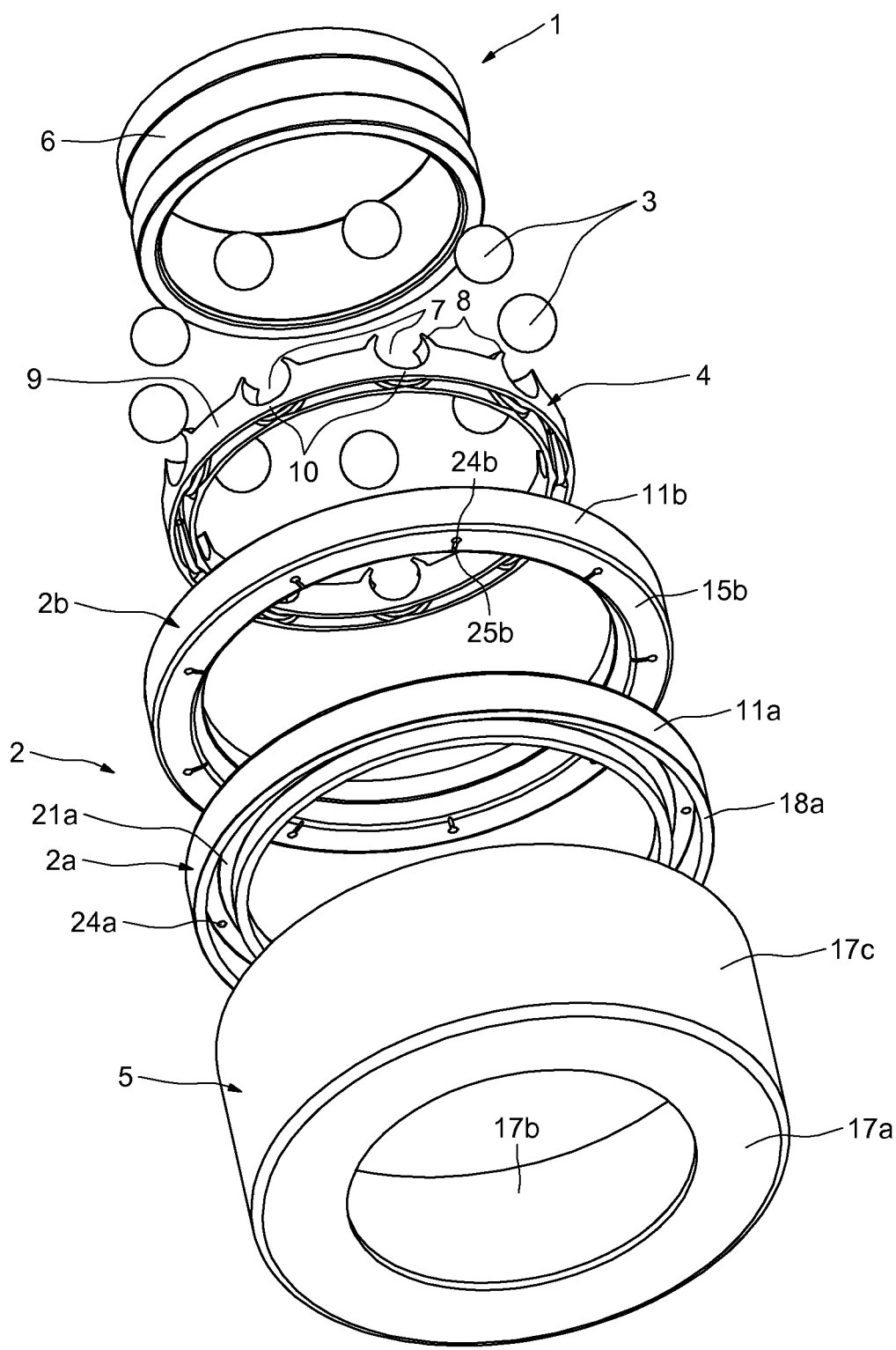
FIG. 1 is an exploded view of the various parts of a rolling bearing according to the invention in a first embodiment.
Figure 2:
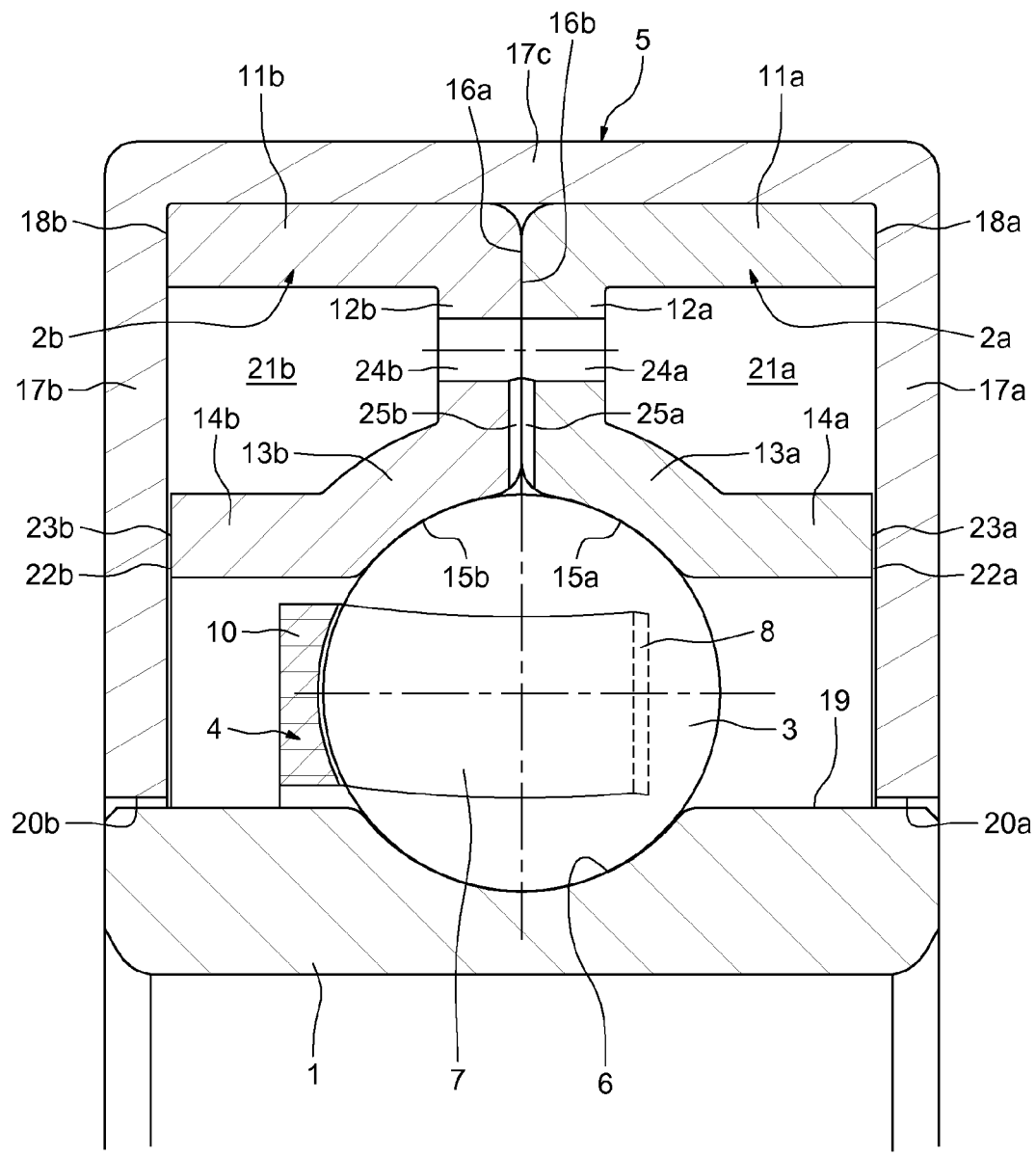
FIG. 2 is an axial half-section of the rolling bearing of the first embodiment illustrated in FIG. 1.

Referring first of all to FIGS. 1 and 2, which illustrate a first embodiment of a rolling bearing according to the invention, said bearing has an inner ring 1 and an outer ring 2 consisting of two outer half rings 2a, 2b with a row of rolling elements that consist in the example illustrated of balls 3, held by a cage 4 between the inner ring 1 and the outer ring 2. An annular housing 5 surrounds the two outer half rings 2a, 2b.

In this example, the inner ring 1 is designed to be mounted on a rotary member. It thus constitutes the rotating ring of the bearing while the outer ring 2 constitutes the non-rotating ring. The inner ring 1 is solid and has a toroidal groove 6, the radius of curvature of which is slightly greater than the radius of the balls 3 and forms a bearing race for the balls 3. The inner ring 1 may be manufactured by turning or by forming a steel blank which is then ground and optionally lapped at the bearing race 6 in order to give the ring 1 its geometric characteristics and its final surface finish.

The cage 4 has a plurality of open cavities 7 bounded by external retaining claws 8. The cavities 7 are advantageously spherical with a diameter slightly greater than that of the balls 3 so as to receive and hold the latter. The cavities 7 are made around the periphery of the annular body 9 of the cage 4, leaving a heel 10 opposite the openings of the various cavities 7. These openings bounded in each case by two opposing claws 8 have a width slightly smaller than the diameter of the balls 3. The balls 3 are fitted by moving the claws 8 apart elastically. The cage 4 can be made of moulded plastic or of metal, depending on the application.

In the embodiment illustrated in FIG. 2, the two parts 2a and 2b of the outer ring 2 are identical and symmetrical with respect to the axial plane of symmetry of the bearing, in order to reduce the manufacturing costs. These two outer half rings 2a, 2b may be manufactured advantageously by cutting and stamping a metal sheet, the pieces obtained then being hardened by heat treatment. The bearing races may then be ground and/or lapped in order to give them their geometric charac-teristics and their definitive surface finish. Since the two half rings 2a, 2b are identical in this example, only one of them, having the reference "a", will be described here, it being understood that the identical elements of the other half ring 2b have the reference "b" in the figures.

The half ring 2a comprises an outer axial portion 11a, a radial portion 12a, a toroidal portion 13a and an inner axial portion 14a. The radial portion 12a is connected to the outer axial portion 11a and to the toroidal portion 13a. The toroidal portion 13a delimits part of a bearing race 15a for the balls 3. The radius of curvature of the bearing race 15a is slightly greater than the radius of the balls 3. The toroidal portion 13a is also connected to the inner axial portion 14a. The two outer half rings 2a, 2b are positioned with the radial faces 16a, 16b of the radial portions 12a, 12b in contact with one another, approximately in the plane of axial symmetry of the rolling bearing and the balls 3.

The housing 5, which is advantageously made of stamped metal sheet, has two radial shields 17a and 17b and an axial portion 17c connected to the two radial shields 17a and 17b, so as to surround the two half rings 2a, 2b and to hold them firmly against one another. The half rings 2a, 2b are centred in the axial portion 17 of the housing 5 by contact between the two axial portions 11a, 11b and the bore of the axial portion 17c. The outer radial faces 18a and 18b which form the annular rims of the two outer axial portions 11a, 11b are in fact in contact with radial shields 17a and 17b of the housing 5, with the result that the two half rings 2a, 2b are clamped together. The two radial shields 17a, 17b extend as far as right next to the cylindrical periphery 19 of the inner ring 1. The inner rims 20a, 20b leave a clearance with respect to the cylindrical surface 19.

Each of the outer half rings 2a, 2b delimits, with the housing 5, an annular closed space 21a, 21b acting as lubricant reservoir, the lubricant contained in these spaces 21a, 21b not being shown in the figure. More specifically, the closed space 21a is delimited by the outer axial portion 11a, the radial portion 12a, the toroidal portion 13a and the inner axial portion 14a, as well as, adjacent to these portions, the radial shield 17a of the housing 5.

The lubricant used may be grease or oil. Passage means may be provided for the lubricant to pass from the closed spaces 21a, 21b functioning as lubricant reservoirs to the bearing races 6 and 15a, 15b.

In the example illustrated in FIG. 2, these passage means are of several types. First of all, there is an axial clearance 22a between the inner face of the radial shield 17a and the outer radial face 23a that forms an annular rim of the inner axial portion 14a. This clearance 22a allows the lubricant contained in the annular reservoir 21a to emerge. It would be conceivable for the clearance 22a to be replaced by a plurality of radial grooves or notches defined between ribs provided on the rim 23a. Other passage means for the emergence of the lubricant consist, in the exemplary embodiment illustrated in FIG. 2, of a plurality of axial through-holes 24a made in the thickness of the radial portion 12a. Each of the holes 24a communicates with a radial passage or duct 25a which consists of a radial groove provided on the inner radial face 16a of the radial portion 12a. The outer end of the radial passage 25a is in communication with the corresponding through-hole 24a, and its inner end is in communication with the toroidal surface 15a so as to guide the lubricant directly onto the balls 3 at the bearing race 15a.

In the example illustrated in FIG. 2, the axial holes 24a and 24b made respectively in the two half rings 2a, 2b at least partly face one another. The same applies to the radial passages 25a and 25b. This arrangement, which can be maintained by suitable positioning during assembly or by angular indexing means (not shown) provided on the two half rings 2a, 2b, makes it possible to improve lubrication. In addition, it makes it possible for the two closed spaces 21a and 21b to communicate. It should be understood, however, that such an arrangement is not essential and that the holes 24a, 24b which are each associated with a radial passage 25a, 25b can easily not be located facing one another.

The various elements of such a rolling bearing are fitted as follows. Once the balls 3 have been inserted in the cavities 7 of the cage 4 and the whole has been fitted on the inner ring 1, the two half rings 2a, 2b are positioned around the row of balls 3. The housing 5 has, at this stage of the assembly process, an L-shaped structure, with an outer cylindrical portion forming the axial portion 17c being connected to a radial portion forming one of the radial shields, for example the shield 17b. The housing thus created is then fitted over the two half rings 2a, 2b once grease has been placed on the shield 17b in the space 21b forming a first lubricant reservoir and between the half ring 2b and the inner ring 1. Grease is also placed in the second space 21a and in the volume between the inner ring 1 and the outer ring 2. It should be noted that the grease used to fill the spaces 21a and 21b can be different from that which is placed between the inner ring 1 and the outer ring 2 in contact with the balls 3. Once the two outer half rings 2a, 2b have been put in place in the L-shaped structure of the housing 5, the outer cylindrical portion of the housing 5 is folded over on the side opposite the radial shield 17b to form the second radial shield 17a opposite the first and to hold the two half rings 2a, 2b firmly against one another by way of their respective outer axial portions 11a and 11b. Once the assembly process is complete, the housing 5 and the two outer half rings 2a, 2b delimit annular closed volumes or spaces 21a, 21b forming lubricant reservoirs.

In the example illustrated in FIG. 2, the lubricant can be grease located in the closed spaces 21a, 21b. The grease can pass through the various passage means, described hereinabove, towards the inner part of the rolling bearing. This passage occurs as indicated hereinabove, through the axial clearance 22a and through the through-holes 24a, 24b and the radial passages 25a, 25b. The viscosity of the grease used could easily be adjusted depending on requirements such that at the normal operating temperature the grease is able to pass through the abovementioned passages.

Preferably, the inner surfaces of the spaces 21a, 21b that form a lubricant reservoir have an oleophobic lining which prevents the lubricant adhering to the inner walls and thus promotes the conveyance of the grease.

Figure 3:
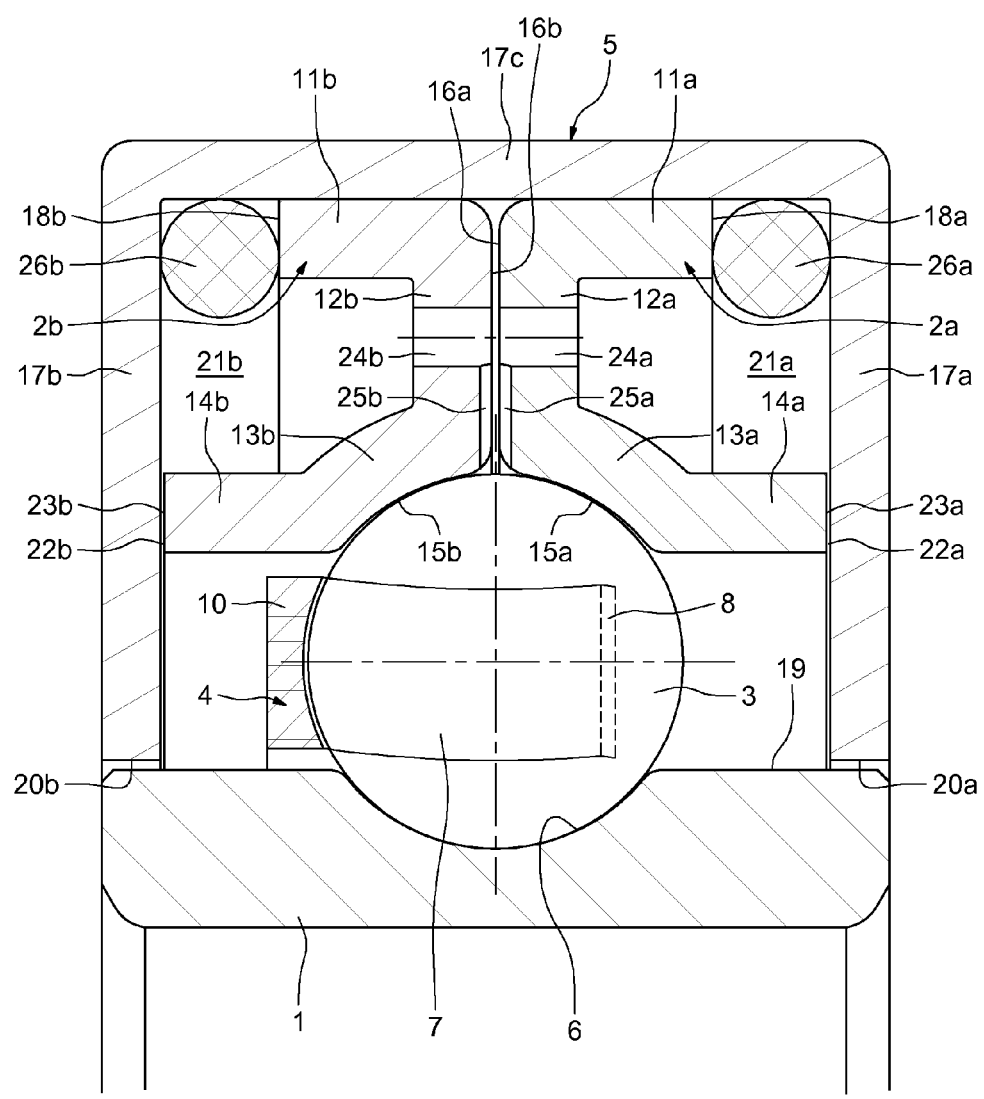
FIG. 3 is an axial half-section of a second embodiment.

The only difference in the embodiment of FIG. 3, in which identical elements bear the same references, is the presence of two resilient elements 26a, 26b in the form of rings, made for example of an elastomer, designed to impart an axial preload. Each of these rings 26a, 26b is fitted within the outer radial rim 18a, 18b of the outer axial portion 11a, 11b. This portion 11a, 11b is shorter than in the embodiment of FIG. 2 so as to allow the resilient element 26a, 26b to be housed between the rim 18a, 18b, on the one hand, and the radial shield 17a, 17b of the housing 5, on the other. Once the housing 5 has been crimped as described hereinabove, the bearing races 15a, 15b and 6 are preloaded on the balls 3 such that the rolling bearing can operate with no internal clearance. It should be noted that in this example, in order to ensure this preload, the inner radial faces 16a, 16b are not in contact, in contrast to the embodiment of FIG. 2. The bearing races could also be preloaded on the balls by using axially resilient corrugated washers bearing against the rims 18a, 18b of the outer axial portions 11a, 11b and the radial shields 17a, 17b of the housing 5.

Figure 4:
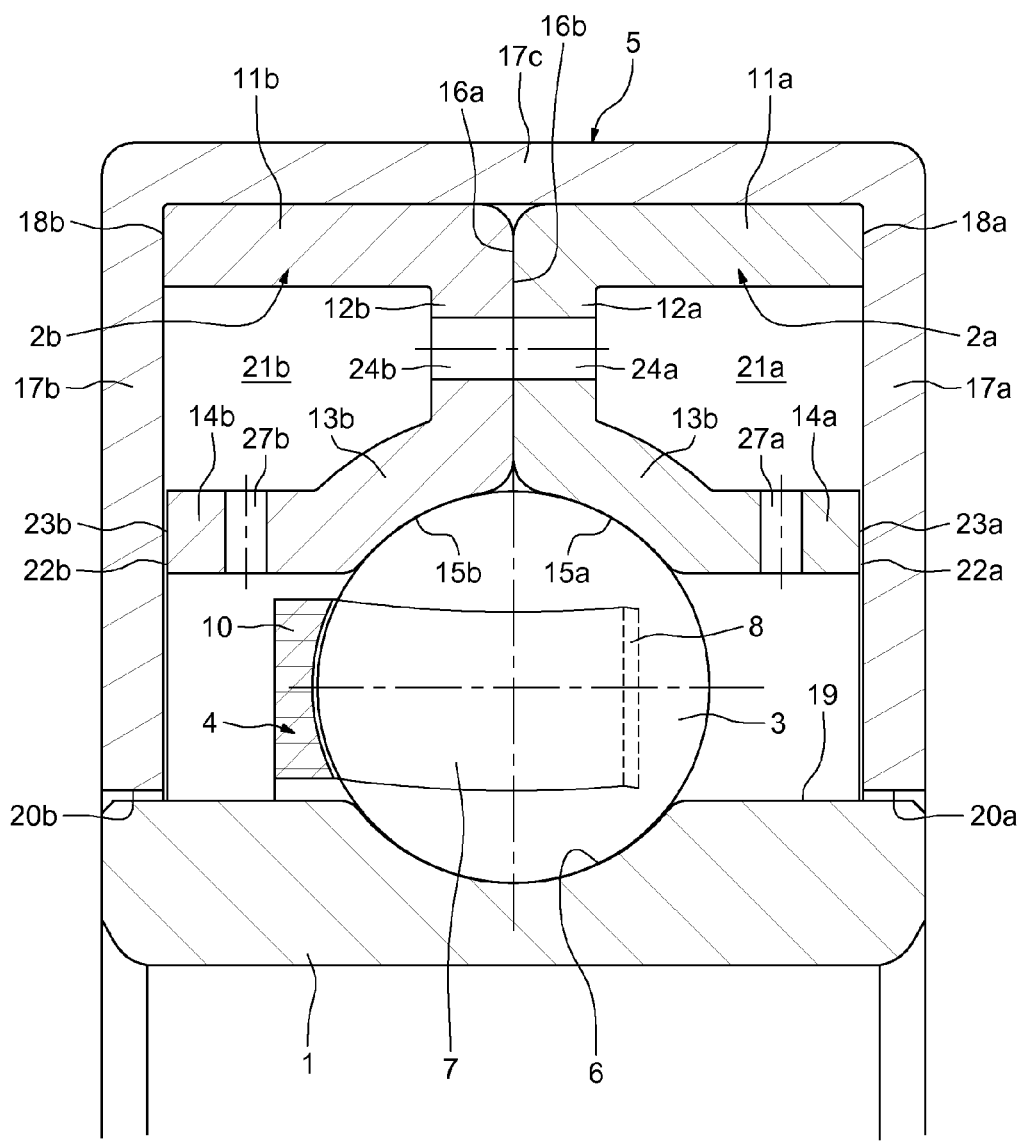
FIG. 4 is an axial half-section of a third embodiment.

The only difference from the embodiment of FIG. 2 in the embodiment of FIG. 4, in which identical elements bear the same references, is the presence of radial communication holes 27a, 27b. In addition, in this embodiment the radial passages 25a, 25b have been removed and the axial holes 24a, 24b retained. Of course, as a variant, it could be possible also to keep the radial passages 25a, 25b or else to remove both the holes 24a, 24b and the passages 25a, 25b. When the holes 24a, 24b are retained, they preferably at least partly face one another in order to ensure communication between the two closed spaces 21a and 21b.

Figure 5:
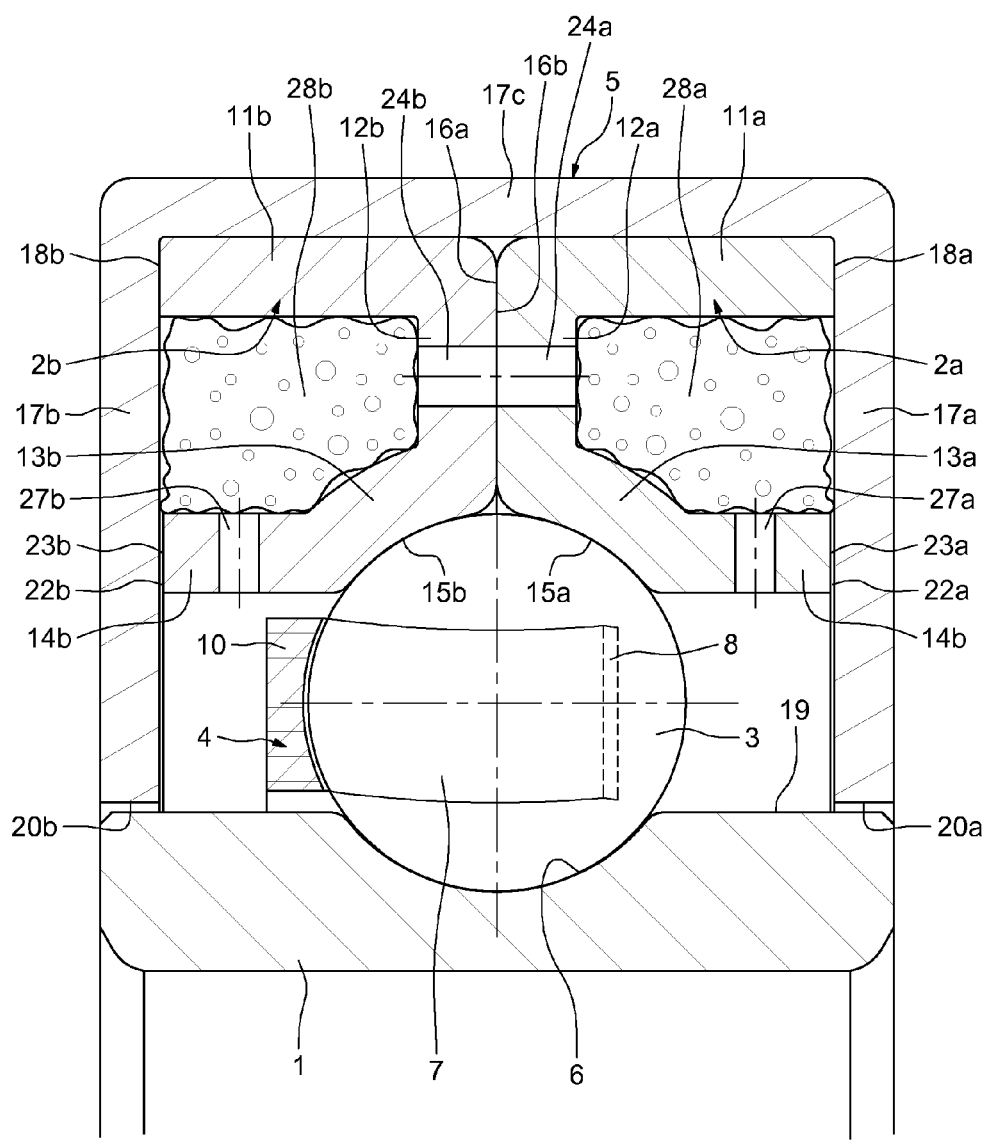
FIG. 5 is an axial half-section of a fourth embodiment.

The embodiment illustrated in FIG. 5 is a variant of that illustrated in FIG. 4, in which the two closed spaces 21a, 21b functioning as lubricant reservoirs contain a cellular or porous annular element 28a, 28b, saturated with an oil compatible with the oil contained in the grease originally placed between the inner ring 1 and the outer ring 2 of the bearing race. The elements 28a, 28b act as sponges and over time are able to release the lubricant oil which then passes as before through the passage means described hereinabove between the spaces 21a, 21b and the bearing races of the bearing. The elements 28a, 28b can take up the whole of the closed spaces 21a, 21b or only part thereof.

Figure 6:
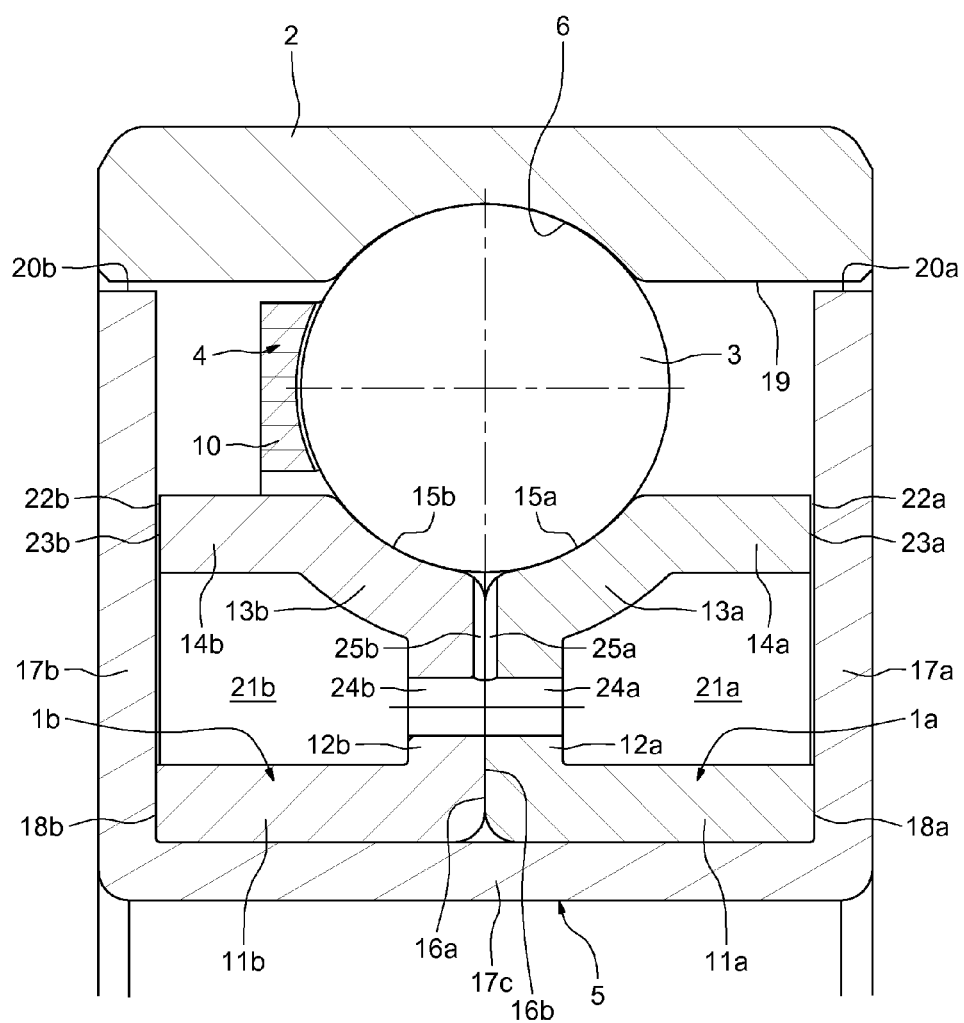
FIG. 6 is an axial half-section of a fifth embodiment.

FIG. 6 illustrates another embodiment, in which the housing 5 this time surrounds two inner half rings 1a, 1b. In this embodiment it is the outer ring 2 that is solid while the two half rings 1a, 1b forming the inner ring 1 are produced by stamping a metal sheet. The arrangement is identical to that of the embodiment illustrated in FIG. 4, but with the elements inverted. This is because in this embodiment it is the outer axial portions 11a, 11b that are in contact with the axial portion 17c of the housing 5. The toroidal portions 13a, 13b, the radial portions 12a, 12b clamped together, and the inner axial portions 14a, 14b can be recognized. The closed spaces 21a, 21b are respectively delimited between the two half rings 1a, 1b and the radial shields 17a, 17b of the housing 5. The lubricant contained in the closed space 21a functioning as a lubricant reservoir passes via the clearance 22a, the axial holes 24a and the radial passages 25a. The lubricant contained in the closed space 21b passes in the same manner through identical passage means. Of course, the variants illustrated in FIGS. 3 to 5 could be applied to this inverted arrangement.

In the embodiment illustrated in FIG. 6, it is advantageous for the inner ring formed by the two half rings 1a, 1b to be the rotating part of the rolling bearing in operation. This is because, in this case, while the rolling bearing rotates, the lubricant contained in the two spaces 21a, 21b functioning as lubricant reservoir is subjected to centrifugal force and tends to diffuse through the radial passages 25a, 25b and through the clearances 22a, 22b towards the bearing races of the bearing.

Figure 7:
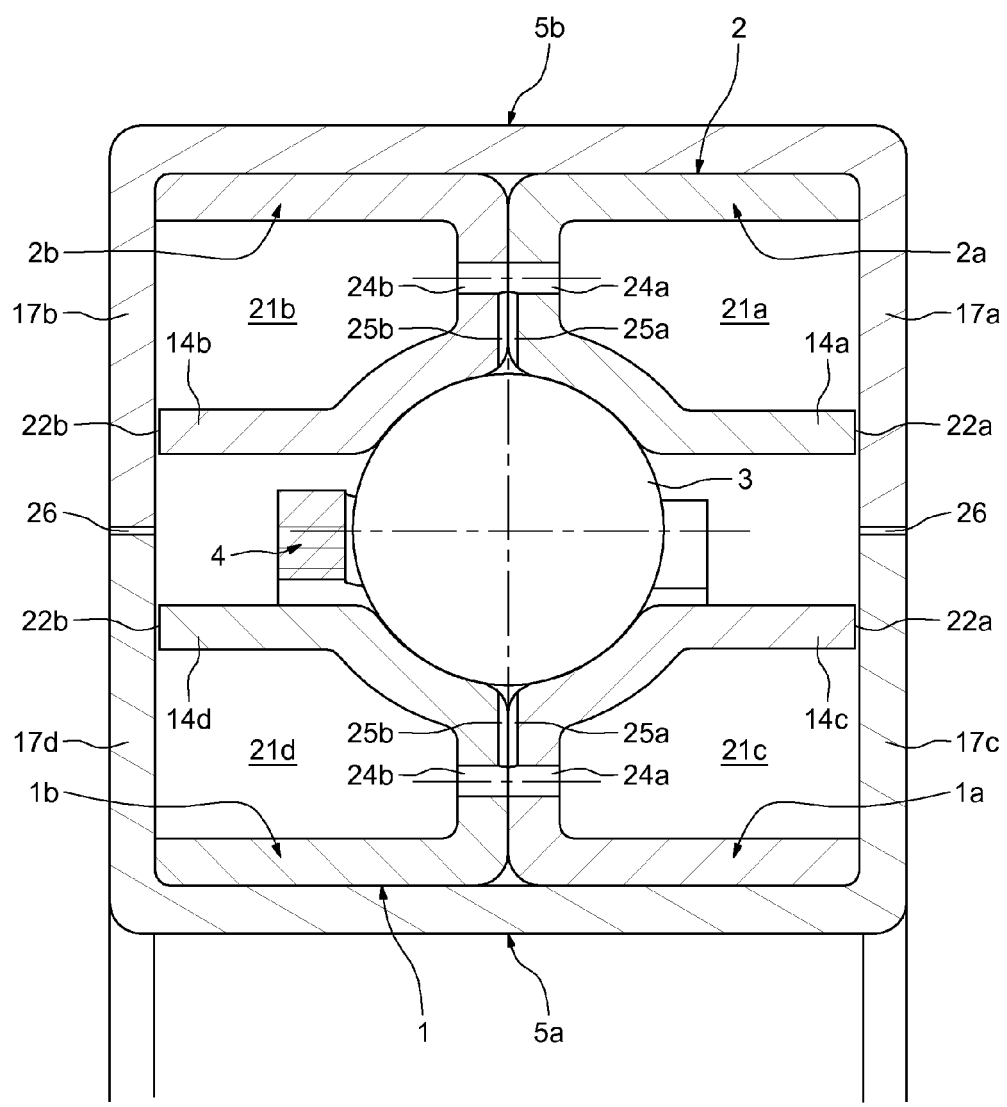
FIG. 7 is an axial half-section of a sixth embodiment.

The embodiment illustrated in FIG. 7 differs from the preceding embodiments solely by the fact that the two rings 1 and 2 of the bearing have the same structure. In other words, the ring 1 which is the inner ring of the bearing is identical to that of the embodiment illustrated in FIG. 6. It is surrounded by a first housing 5a. The second ring 2 of the bearing for its part is identical to that illustrated in FIG. 2. It is surrounded by a second housing 5b. The respective radial shields 17a, 17b and 17c, 17d face one another with a radial gap 26. In this embodiment, the rolling bearing thus has four closed spaces acting as lubricant reservoir. That is to say, the spaces 21a and 21b are delimited by each of the two parts 2a and 2b of the outer ring 2 and the spaces 21c and 21d are delimited by the two parts 1a and 1b of the inner ring 1. In the embodiment illustrated in FIG. 7, the lubricant passages delimited by the axial clearances 22a, 22b between each of the two housings 5a, 5b and the annular rims of the respective axial portions 14a, 14b and 14c, 14d can furthermore be recognized. The axial through-holes 24a, 24b which communicate with radial passages or ducts 25a, 25b can also be recognized, as in the embodiments described hereinabove.

Generally, all the features of the embodiments described hereinabove can be used in the embodiment illustrated in FIG. 7.

The features and characteristics mentioned for each of the embodiments illustrated in the figures could be applied to the other embodiments without substantially modifying the invention. Although two closed spaces delimiting two annular reservoirs have been provided in the examples illustrated, it should be understood that a single reservoir could be provided as a variant. One of the half rings could then be solid, with the lubricant reservoir being delimited by the other half ring.

By virtue of the present invention it is possible to obtain a rolling bearing that is economical to manufacture, is light and has a large reserve of lubricant enabling it to operate for a very long time without needing relubrication.

Although the present invention has been illustrated on the basis of ball bearings having a single row of balls, it should be understood that the invention can be applied to bearings using rolling elements that are not balls and/or to several rows of rolling elements, without major modifications. The invention can also be applied to different types of ball bearings, such as deep-groove bearings, angular contact bearings, or else to self-aligning bearings.

The invention claimed is:

1. A rolling bearing comprising:
an inner ring having a bearing race;
an outer ring having a bearing race;
at least one row of rolling elements disposed between the bearing races of the inner and outer rings;
a cage retaining the at least one row of rolling elements;
an annular housing surrounding at least one of the inner and outer rings, the one of the inner and outer rings surrounded by the annular housing including two ring parts, each of the two ring parts forming a separate enclosed lubricant storage space defined between the annular housing and an associated one of the two ring parts and containing a lubricant, each of the two ring parts having a radial portion and an axial hole extending through the radial portion, each axial hole at least partly facing the axial hole in the other one of the two ring parts and the two axial holes establishing fluidly communication between the two enclosed lubricant storage spaces;
wherein the annular housing has an axial portion and a radial shield and at least one of the two ring parts surrounded by the annular housing is formed by cutting and stamping a metal sheet, the at least one of the two ring parts formed by stamping comprises:
an outer axial portion in contact with the housing axial portion and the housing radial shield;
the radial portion;
a toroidal portion delimiting a part of one of the bearing races;
and an inner axial portion; and
wherein at least one of the enclosed lubricant storage spaces is defined by the outer axial portion, the radial portion, the toroidal portion, and the inner axial portion, of one of the two ring parts in combination with the radial shield of the annular housing.

2. The rolling bearing according to claim 1, wherein the lubricant is grease.

3. The rolling bearing according to claim 1, wherein the lubricant is contained in a porous element fitted inside each of the two enclosed lubricant storage spaces.

4. The rolling bearing according to claim 3, wherein the lubricant is oil.

5. The rolling bearing according to claim 1, further comprising passage means for the lubricant to pass between at least one of the two enclosed lubricant storage spaces and at least one of the bearing races.

6. The rolling bearing according to claim 5, wherein the passage means include at least one radial hole extending through one of the two ring parts.

7. The rolling bearing according to claim 5, wherein the passage means includes each axial hole and a separate radial passage communicating with the axial hole.

8. The rolling bearing according to claim 7, wherein each separate radial passage opens onto the bearing race of the one of the inner and outer rings.

9. The rolling bearing according to claim 8, wherein the separate radial passage communicates with the axial hole by connecting with and extending directly from the axial hole.

10. The rolling bearing according to claim 1, wherein the periphery of the one of the inner and outer rings contacts the axial portion of the annular housing.

11. The rolling bearing according to claim 1, wherein the radial portion of the one of the inner and outer rings contacts the radial shield of the annular housing.

12. The rolling bearing according to claim 1, wherein the two parts of the one of the inner and outer rings are substantially identical.

13. The rolling bearing according to claim 1 wherein the two ring parts of the one of the inner and outer rings surrounded by the annular housing are separate components from each other without attachment means therebetween.

14. The rolling bearing according to claim 1, wherein inner wall surfaces of the two ring parts and the annular housing which define the two enclosed lubricant storage spaces have an oleophobic lining.

15. The rolling bearing according to claim 1, wherein each one of the inner and outer rings has two ring parts and the bearing further comprises another annular housing surrounding the other one of the inner and outer rings, each of the inner and outer rings forming with a separate one of the two annular housings at least one enclosed lubricant storage space, a lubricant being disposed within each of the at least one enclosed lubricant storage space.

16. The rolling bearing according to claim 1 in combination with one of an electric motor and a generator.

17. A rolling bearing comprising:
an inner ring having a bearing race;
an outer ring having a bearing race;
at least one row of rolling elements disposed between the bearing races of the inner and outer rings;
a cage retaining the rolling elements;
an annular housing surrounding at least one of the inner and outer rings, the one of the inner and outer rings surrounded by the annular housing including two ring parts, each of the two ring parts forming a separate enclosed lubricant storage space defined between the housing and an associated one of the two ring parts and containing a lubricant, each of the two ring parts having a radial portion and an axial hole extending through the radial portion, each axial hole at least partly facing the axial hole in the other one of the two ring parts and the two axial holes establishing fluidly communication between the two enclosed lubricant storage space;

passage means for the lubricant to pass between at least one of the two enclosed lubricant storage spaces and at least one of the bearing races; and wherein the passage means include radial surface portions of at least one of the two ring parts, the radial surface portions being spaced apart from a radial shield facing the housing so as to define an axial clearance.

18. A rolling bearing comprising:

an inner ring having a bearing race;

an outer ring having a bearing race;

at least one row of rolling elements disposed between the bearing races of the inner and outer rings;

a cage retaining the rolling elements;

an annular housing surrounding at least one of the inner and outer rings, the one of the inner and outer rings surrounded by the annular housing including two ring parts, each of the two ring parts forming a separate enclosed lubricant storage space defined between the housing and an associated one of the two ring parts and containing a lubricant, each of the two ring parts having a radial portion and an axial hole extending through the radial portion, each axial hole at least partly facing the axial hole in the other one of the two ring parts and the two axial holes establishing fluidly communication between the two enclosed lubricant storage spaces; and wherein each axial hole communicates with a radial groove formed in the inner face of the radial portion of each of the two ring parts.

19. The rolling bearing according to claim 18, wherein the axial hole and the radial groove of each one of the two ring parts of are aligned with the axial hole and the radial groove of the other one of the two ring parts.

20. A rolling bearing comprising:

an inner ring having a bearing race;

an outer ring having a bearing race;

at least one row of rolling elements disposed between the bearing races of the inner and outer rings;

a cage retaining the rolling elements;

an annular housing surrounding at least one of the inner and outer rings, the one of the inner and outer rings surrounded by the annular housing including two ring parts, each of the two ring parts forming a separate enclosed lubricant storage space defined between the housing and an associated one of the two ring parts and containing a lubricant, each of the two ring parts having a radial portion and an axial hole extending through the radial portion, each axial hole at least partly facing the axial hole in the other one of the two ring parts and the two axial holes establishing fluidly communication between the two enclosed lubricant storage spaces; and wherein resilient elements are fitted between each of the two ring parts and a separate one of two radial shields of the housing so as to preload the two ring parts against the rolling elements.

\* \* \* \* \*